United States Patent
Gandhi et al.

(10) Patent No.: US 7,565,152 B2
(45) Date of Patent: Jul. 21, 2009

(54) METHOD OF CONTROLLING OVERLOAD OVER THE REVERSE LINK

(75) Inventors: Asif D Gandhi, Iselin, NJ (US); Frances Jiang, Whippany, NJ (US); Mathew Thomas, Madison, NJ (US); Stanley Vitebsky, Parsippany, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 961 days.

(21) Appl. No.: 10/632,065

(22) Filed: Jul. 31, 2003

(65) Prior Publication Data

US 2005/0026624 A1 Feb. 3, 2005

(51) Int. Cl.
*H04W 72/00* (2009.01)

(52) U.S. Cl. .................. 455/453; 455/452.1; 455/452.2

(58) Field of Classification Search ... 455/115.1–115.4, 455/436, 450, 451, 452.1, 452.2, 453; 370/318
See application file for complete search history.

(56) References Cited

U.S. PATENT DOCUMENTS

| | | | |
|---|---|---|---|
| 5,914,950 A * | 6/1999 | Tiedemann et al. | 370/348 |
| 6,442,398 B1 * | 8/2002 | Padovani et al. | 455/522 |
| 6,944,449 B1 | 9/2005 | Gandhi et al. | |
| 7,142,867 B1 | 11/2006 | Gandhi et al. | |
| 2002/0052204 A1 * | 5/2002 | Bender et al. | 455/450 |
| 2002/0067701 A1 | 6/2002 | Chen et al. | 370/318 |
| 2002/0067707 A1 | 6/2002 | Morales et al. | 370/331 |
| 2002/0136192 A1 * | 9/2002 | Holma et al. | 370/347 |
| 2002/0151310 A1 * | 10/2002 | Chung et al. | 455/452 |
| 2002/0167933 A1 * | 11/2002 | Feli et al. | 370/349 |
| 2003/0031130 A1 * | 2/2003 | Vanghi | 370/235 |
| 2004/0160914 A1 * | 8/2004 | Sarkar | 370/329 |
| 2004/0219917 A1 * | 11/2004 | Love et al. | 455/436 |

* cited by examiner

*Primary Examiner*—Charles N Appiah
*Assistant Examiner*—Jaime M Holliday

(57) ABSTRACT

A method of wireless communication over the reverse link. The method may include evaluating a reverse link loading. This evaluation step may involve examining at least two resources associated with reverse link loading within a first time period. Thereafter, a message is broadcast containing information regarding the availability of resources. This message is generated in response to the evaluated reverse link loading. This availability of resources message may correspond with an overload condition, increasing a number of active connections, decreasing the number of active connections, increasing an available transmit rate, maintaining the available transmit rate and/or decreasing the available transmit rate. In one example, the availability of resources message comprises a reverse activity bit.

19 Claims, 4 Drawing Sheets

FIG. 7

| FILTERED LOADING (L) | NORMAL REGION | FAST CONTROL REGION |
| --- | --- | --- |
| $0 <= L < L1$ | $R_{fast} <= f\_THRESH\_1$ | $R_{fast} > f\_THRESH\_1$ |
| $L1 <= L < L2$ | $R_{fast} <= f\_THRESH\_2$ | $R_{fast} > f\_THRESH\_2$ |
| $L2 <= L < 1$ | $R_{fast} <= f\_THRESH\_3$ | $R_{fast} > f\_THRESH\_3$ |

FIG. 8

| FILTERED LOADING (L) | NORMAL REGION | FAST CONTROL REGION |
| --- | --- | --- |
| $0 <= L < L1$ | $R_{slow} <= s\_THRESH\_1$ | $R_{slow} > s\_THRESH\_1$ |
| $L1 <= L < L2$ | $R_{slow} <= s\_THRESH\_2$ | $R_{slow} > s\_THRESH\_2$ |
| $L2 <= L < 1$ | $R_{slow} <= s\_THRESH\_3$ | $R_{slow} > s\_THRESH\_3$ |

METHOD OF CONTROLLING OVERLOAD OVER THE REVERSE LINK

FIELD OF THE INVENTION

This invention relates to telecommunications and, more particularly, to wireless communications.

BACKGROUND OF THE INVENTION

Wireless communications systems provide wireless service to a number of wireless or mobile units situated within a geographic region. The geographic region supported by a wireless communications system is divided into spatially distinct areas commonly referred to as "cells." Each cell, ideally, may be represented by a hexagon in a honeycomb pattern. In practice, however, each cell may have an irregular shape, depending on various factors including the topography of the terrain surrounding the cell. Moreover, each cell is further broken into two or more sectors. Each cell is commonly divided into three sectors, each having a range of 120 degrees, for example.

A conventional cellular system comprises a number of cell sites or base stations geographically distributed to support the transmission and reception of communication signals to and from the wireless or mobile units. Each cell site handles voice communications within a cell. Moreover, the overall coverage area for the cellular system may be defined by the union of cells for all of the cell sites, where the coverage areas for nearby cell sites overlap to ensure, where possible, contiguous communication coverage within the outer boundaries of the system's coverage area.

Each base station comprises at least one radio and at least one antenna for communicating with the wireless units in that cell. Moreover, each base station also comprises transmission equipment for communicating with a Mobile Switching Center ("MSC"). A mobile switching center is responsible for, among other things, establishing and maintaining calls between the wireless units, between a wireless unit and a wireline unit through a public switched telephone network ("PSTN"), as well as between a wireless unit and a packet data network ("PDN"), such as the Internet. A base station controller ("BSC") administers the radio resources for one or more base stations and relays this information to the MSC.

When active, a wireless unit receives signals from at least one base station over a forward link or downlink and transmits signals to at least one base station over a reverse link or uplink. Several approaches have been developed for defining links or channels in a cellular communication system, including time division multiple access ("TDMA"), frequency division multiple access ("FDMA"), orthogonal frequency division multiple access ("OFDMA") and code division multiple access ("CDMA"), for example.

For voice applications, conventional cellular communication systems employ dedicated links between each relevant wireless unit and a corresponding base station. Voice communications are delay-intolerant by nature. Consequently, wireless units in wireless cellular communication systems transmit and receive signals over one or more dedicated links. Each active wireless unit, as a result, generally requires the assignment of a dedicated link on the downlink, as well as a dedicated link on the uplink.

With the explosion of the Internet and the increasing demand for data, resource management has become a growing issue in cellular communication systems. Unlike voice, however, data communications may be relatively delay tolerant and potentially bursty in nature. Data communications, as such, may not require dedicated links on the downlink or the uplink, but rather enable one or more channels to be shared by a number of wireless units. By this arrangement, each of the wireless units on the uplink competes for available resources. Resources to be managed in the uplink include the received power at the base station, and the interference created by each user to other users in the same sector or cell, as well as in other sectors or cells, for example. This is in contrast to the resources to be managed on the downlink, including fixed transmit power budgets.

One byproduct of the explosion in data applications is an increase in traffic. More particularly, data traffic growth over the uplink raises concerns regarding overload. An overload condition may cause increased interference, thereby degrading system performance. For the purposes of the present disclosure, an overload condition refers to a condition wherein one or more new users are denied access to the wireless network over the uplink. Heavy data traffic over the uplink may cause an overload condition, forcing a new user to wait either for an "in" network user to exit the network and/or for the system to terminate an "in" network user's access, based on inactivity or priority, for example. Moreover, once a new user is granted access to the network in heavy traffic, the data transmission rate afforded to each user over the uplink may depend on the air interface, as well as interference, taking degrading system conditions into consideration.

Consequently, a demand exists for a method that addresses the concerns surrounding overload and system performance degrading over the uplink. A need further exists for a method that supports increased user access over the uplink in an overload condition. Moreover, a demand exists for a method that may vary data transmission rate afforded to each user over the uplink if the network is in an overload condition.

SUMMARY OF THE INVENTION

The present invention provides a method that addresses the concerns surrounding overload and system performance degrading over the uplink. More particularly, the method provides increased user access to the network in an overload condition over the uplink. The method provides controls over the uplink of the data transmission rate afforded to each user over the uplink if the network is in an overload condition.

In one embodiment, a method of the present invention includes evaluating a reverse link loading. This evaluation step may involve examining two or more resources associated with reverse link loading within a first time period. Thereafter, a message may be broadcast containing information regarding the availability of resources. This message may be broadcast in response to the evaluated reverse link loading and might comprise a reverse activity bit. This availability of resources message may correspond with an overload condition, increasing the number of active connections, decreasing the number of active connections, increasing an available transmit rate, maintaining the available transmit rate and/or decreasing the available transmit rate.

In another embodiment, a wireless communication system of the present invention includes a detector for evaluating a reverse link loading. This detector may realize this evaluation by examining at least two resources associated with reverse link loading within a first time period. The wireless communication system also has a controller for controlling the reverse link loading by broadcasting an availability of resources message. This message may be broadcast in response to the evaluated reverse link loading and may comprise a reverse activity bit. This availability of resources message may correspond with an overload condition, increasing a number of active connections, decreasing the number of active connections, increasing an available transmit rate, maintaining the available transmit rate and/or decreasing the available transmit rate.

In another embodiment, a method of the present invention includes the step of determining a loading on the reverse link. Thereafter, the reverse link loading is managed in response to the determined loading. This step may be realized by controlling a reverse link traffic channel and/or controlling a number of active connections. Here, the step of controlling the reverse link traffic channel traffic channel may comprise a relatively faster control of the traffic channel, while the step of controlling a number of active connections may comprise a relatively slower control. The method may also include the step of broadcasting message corresponding with the availability of resources.

BRIEF DESCRIPTION OF THE DRAWINGS

The present invention will be better understood from reading the following description of non-limiting embodiments, with reference to the attached drawings, wherein below:

FIG. 7 depicts a table associated with the present invention; and

FIG. 8 depicts another table associated with the present invention.

It should be emphasized that the drawings of the instant application are not to scale but are merely schematic representations, and thus are not intended to portray the specific dimensions of the invention, which may be determined by skilled artisans through examination of the disclosure herein.

DETAILED DESCRIPTION

The present invention provides a method that addresses the concerns surrounding overload and system performance degrading over the uplink. More particularly, the method provides increased user access to the network in an overload condition over the uplink. The method provides controls over the uplink of the data transmission rate afforded to each user over the uplink if the network is in an overload condition.

Figure 1:
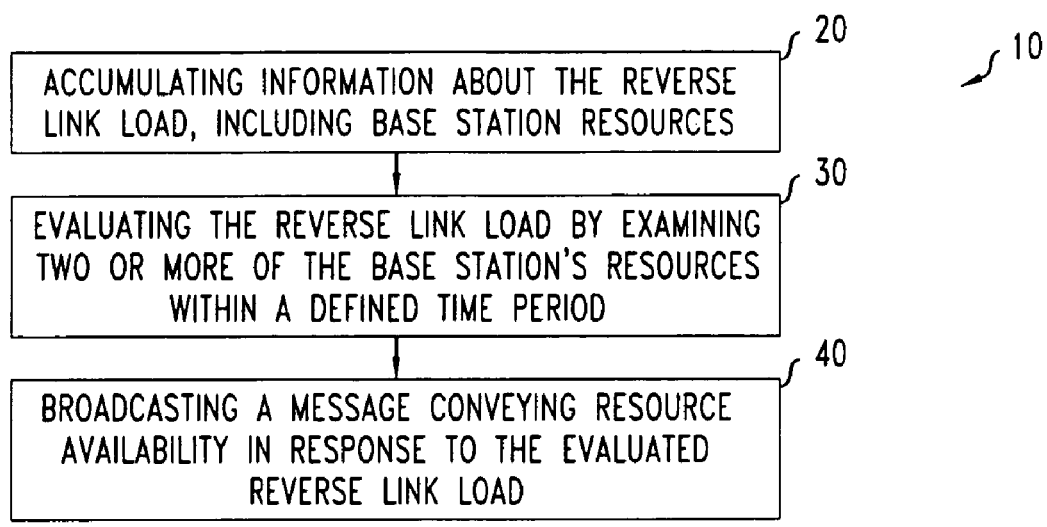
FIG. 1 depicts an embodiment of the present invention.

Referring to FIG. 1, a flow chart depicting one embodiment of the present invention is illustrated. More particularly, a method (10) is depicted for controlling the loading over the reverse link. For the purposes of the present disclosure, loading may refer to traffic volume, active or passive, or RF loading which exercises the resources of the base station. Traffic volume over the reserve link may be measured in terms of normalized aggregate throughput with respect to the maximum throughput capacity of the reverse link in percent. RF loading may be measured in terms of the ratio of the aggregate RF receive signal power at the base station to the total receive signal and noise power. It should be noted that video and/or a voice transmission schemes are also contemplated herein.

The method (10) initially accumulates information about the base station resources (step 20). More particularly, the information accumulated may be directed toward the reverse link load. The step of accumulating may include gathering base station data on resource in use or leftover. Exemplary data accumulated on resources may include sector loading (e.g., traffic loading), total interference, received signal strength indication ("RSSI"), frame error rate, filtered loading estimate, transmit power and power control loop overload set point, for example. It should be noted that these resources correspond with the number of wireless units accessing the system, as well as the reverse system loading.

Once the base station resource information is accumulated, the method (10) evaluates the reverse link load (step 30). Here, two or more of the base station resources accumulated are examined. This examination may be performed within first time scale or period. In one example, this first time period is on the order of one (1) second to 100s of milliseconds. It should be noted that by examining two or more of resources within a given time period, the load on the reverse link might be determined.

As detailed hereinabove, the resources examined may include sector RF loading and received signal strength indication, for example. Sector loading may be computed by measuring the received energy in a pilot signal transmitted by the wireless unit. This computation may take total noise, data rate control ("DRC") values, channel gain and used Walsh code space into consideration to arrive at the RF loading value.

In one example of the step of evaluating, a rise in the received signal strength indication may be of benefit in performing the step of evaluating the reverse link load. To determine the rise in the received signal strength indication, the received signal strength indication is first sampled. Thereafter, a noise floor may be calculated along with the rise in the received signal strength indication.

Further, the rise in the received signal strength indication may correspond with a number of variables. The rise in the received signal strength indication may be dependent on the total received power at a sector, the calculated noise floor and a threshold that varies to minimize adverse control reactions. More particularly, the received signal strength indication may comprise the total received power at a sector such that the rise in the received signal strength indication may include the rise of the received signal strength indication above the calculated noise floor.

Moreover, it should also be noted that the rise in the received signal strength indication might have an associated threshold thereto. This threshold may vary in response to the step of evaluating. More particularly, the threshold may be raised to a relatively higher value than initially set if the step of evaluating results in determining the reverse link load to be relatively smaller than an initial set point. Similarly, the threshold may be lowered to a relatively lower value than initially set if the step of evaluating results in determining the reverse link load to be relatively larger than an initial set point. By this arrangement, adverse control reactions based on the rise in the received signal strength indication may be minimized.

Once the reverse link load has been evaluated, the method (10) broadcasts an availability message (step 40). The availability message conveys to wireless units in a sector of the availability of the base station's resources over the reverse link. In one example, the availability message may comprise a reverse activity bit ("RAB").

As a result, the message broadcast corresponds with the evaluated reverse link loading. The availability message may correspond with an overload condition on the reverse link. Similarly, the availability message may correspond with increases, decreases or maintaining the number of active connections by allowing more or less users to access the reverse link. Moreover, the availability message may also correspond with increases, decreases or maintaining an available transmit rate for each wireless unit accessing the reverse link.

In one example, the step of broadcasting an availability message method may also include controlling the reverse link loading. Here, a reverse link traffic channel may be managed depending on an average of the received signal strength indication rise and a filtered or fractional loading estimate. Moreover, the number of connections actively accessing the reverse link may be managed depending on the average of the received signal strength indication rise and the filtered loading estimate as well.

Figure 4:
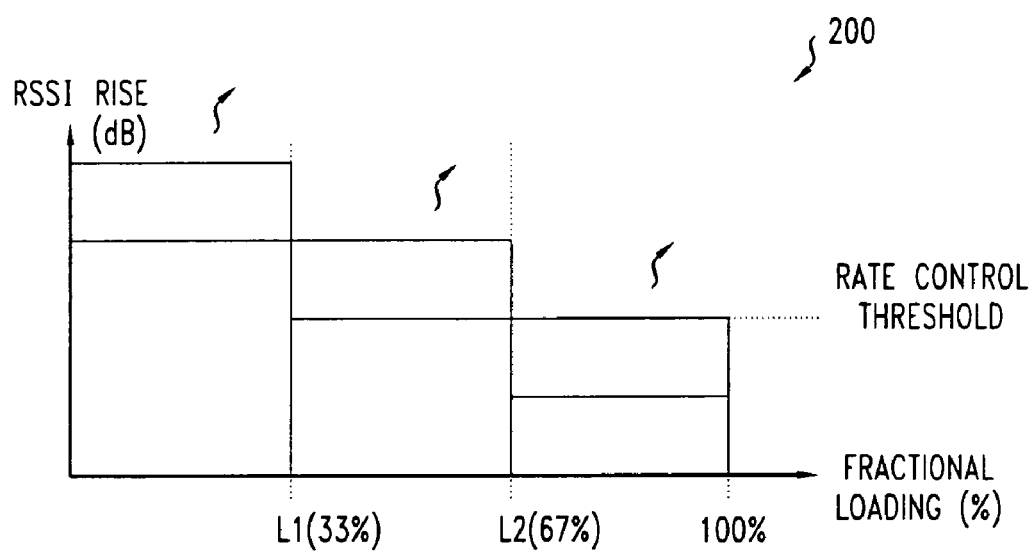
FIG. 4 depicts an aspect of the present invention.
Figure 5:
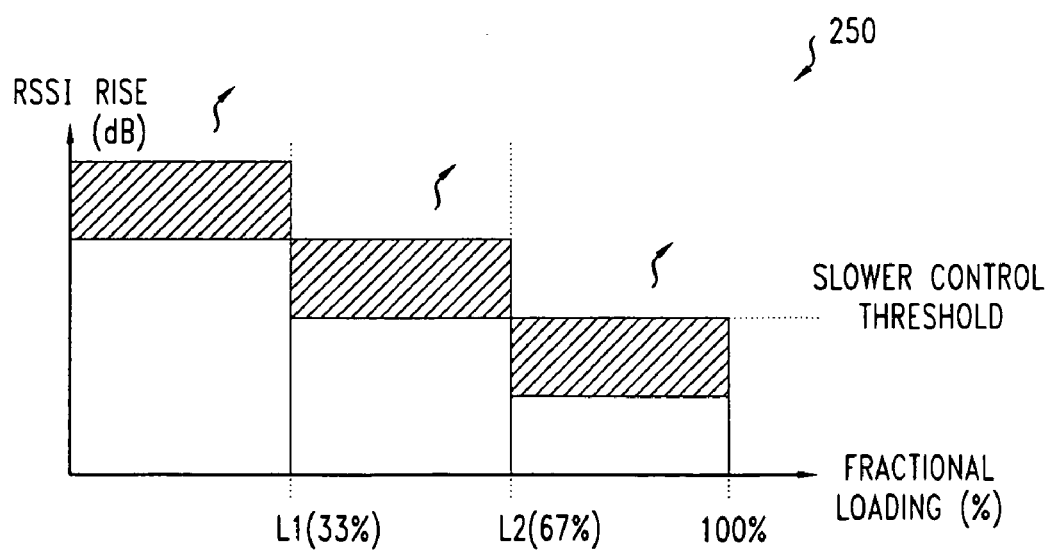
FIG. 5 depicts another aspect of the present invention.

These aspects of the invention are depicted in FIGS. 4 and 5 and may be termed a slow control or fast control based on relatively long-term or relatively short-term time periods. More particularly, the slow control is based on a relatively long term average value of the received signal strength indication rise and a filtered or fractional loading estimate. This slow control mechanism may support increasing, decreasing or maintaining the number of wireless users able to access the reverse link. In one example, the relatively long term average value may refer to an average calculation over a time period of 5 seconds for each sector/carrier. FIG. 5 depicts a slow control mechanism based on long-term averages.

Similarly, the fast control mechanism may be predicated on a relatively short term average value of the received signal strength indication rise and a filtered or fractional loading estimate. This fast control mechanism may support increasing, decreasing or maintaining the transmit rate of users accessing the reverse link. It should be noted that the available transmit rate over the reverse link may also be determined in response to examined resources within a second time period, wherein the second time period may be an order of magnitude greater (e.g., ten (10) seconds) than the first time period associated with the step of evaluating. In one example, the relatively short term average value may refer to an average calculation over a time period of 200 milliseconds for each sector/carrier. FIG. 4 depicts a fast control mechanism based on short-term averages.

Figure 2:
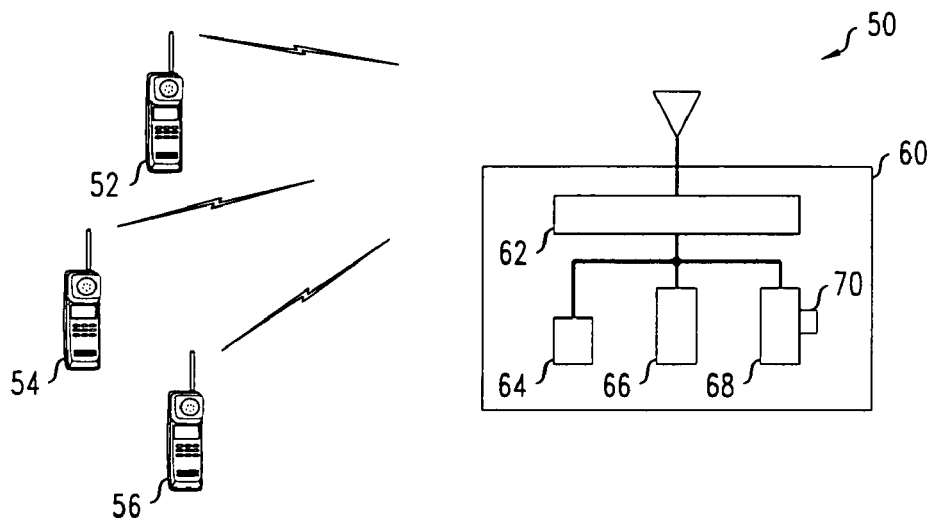
FIG. 2 depicts another embodiment of the present invention.

Referring to FIG. 2, another embodiment of the present invention is illustrated. Here, a wireless communication system 50 is depicted having a number of cellular wireless units, 52, 54 and 56. Each wireless unit is capably positioned to be in wireless communication with a base station 60 through a radio frequency ("RF") section 62. More particularly, each wireless unit is capable of making a call through base station 60 over the reverse link.

To control an overload condition over the reverse link, base station 60 comprises a detector 64 for evaluating the loading over the reverse link. Detector 64 examines two or more resources associated with the reverse link. As stated hereinabove, these resources may include sector loading, total interference, received signal strength indication, local (e.g., at each leg of the link) or global (e.g., before or after frame selector) frame error rate, filtered loading estimate, transmit power and power control outer-loop set point compared to the measured Eb/Nt. This examination may be performed within first time scale or period. In one example, this first time period is on the order of one (1) second. It should be noted that detector 64 may also determine an available transmit rate in response to examining at least two resources associated with the reverse link within a second time period, the second time period being an order of magnitude greater than the first time period.

By examining two or more of resources within the first time period, the load on the reverse link might be determined. As detailed hereinabove, the resources examined may include sector loading and received signal strength indication, for example. Consequently, detector 64 may compute sector loading by measuring the energy in an originally transmitted pilot signal. This computation may take total noise, DRC values, channel gain, error rates on the physical channel, and used Walsh code space into consideration.

In evaluating the reverse link load, a rise in the received signal strength indication may be of benefit. To determine the rise in the received signal strength indication, sampler 68 initially samples the received signal strength indication. Thereafter, rise in the received signal strength indication may be calculated, along with a noise floor by means of calculator 70.

It should also be noted that the rise in the received signal strength indication might have an associated threshold thereto. This threshold may vary in response to detector 64 evaluating the reverse link load by examining the resources. More particularly, this threshold may be raised to a relatively higher value than initially set if the step of evaluating loading using the other metric(s) results in determining the reverse link load to be relatively smaller than an initial set point. Similarly, the threshold may be lowered to a relatively lower value than initially set if the step of evaluating loading using the other metric(s) results in determining the reverse link load to be relatively larger than an initial set point. By this arrangement, adverse control reactions based on using the rise in the received signal strength indication may be minimized.

To control the loading over the reverse link, base station 60 also comprises a controller 66. Controller 66 may have any number of realizations, such as a microcontroller or microprocessor, for example, to control the reverse link load. One such function may include generating an availability message to be broadcast by RF section 60. As noted hereinabove, this message conveys to wireless units 52, 54 and 56 in a sector of the availability of the base station's resources over the reverse link. In one example, the availability message may comprise a reverse activity bit ("RAB").

Moreover, controller 66 may also manage a reverse link traffic channel. Controller 66 may also manage the number of connections (e.g., wireless units 52, 54 and 56) actively accessing the reverse link may be managed depending on the average of the received signal strength indication rise and the filtered loading estimate as well. To achieve these objectives, controller 66 receives the resource evaluation from detector 64, including an average of the received signal strength indication rise and a filtered or fractional loading estimate.

In one example, controller 66 may perform a relatively fast control of the traffic channel, or in the alternative, a relatively slower control of the number of active connection based on relatively long term or relatively short term time periods. Here, the slow control is based on a relatively long term average value of the received signal strength indication rise and a filtered or fractional loading estimate. This slow control mechanism may support increasing, decreasing or maintaining the number of wireless users able accessing the reverse link. Similarly, the fast control mechanism may be predicated on a relatively short term average value of the received signal strength indication rise and a filtered or fractional loading estimate. This fast control mechanism may support increasing, decreasing or maintaining the transmit rate of users accessing the reverse link. It should be noted that the available transmit rate over the reverse link may also be determined in response to examined resources within a second time period, wherein the second time period may be an order of magnitude greater (e.g., ten (10) seconds) than the first time period associated with the step of evaluating.

Figure 3:
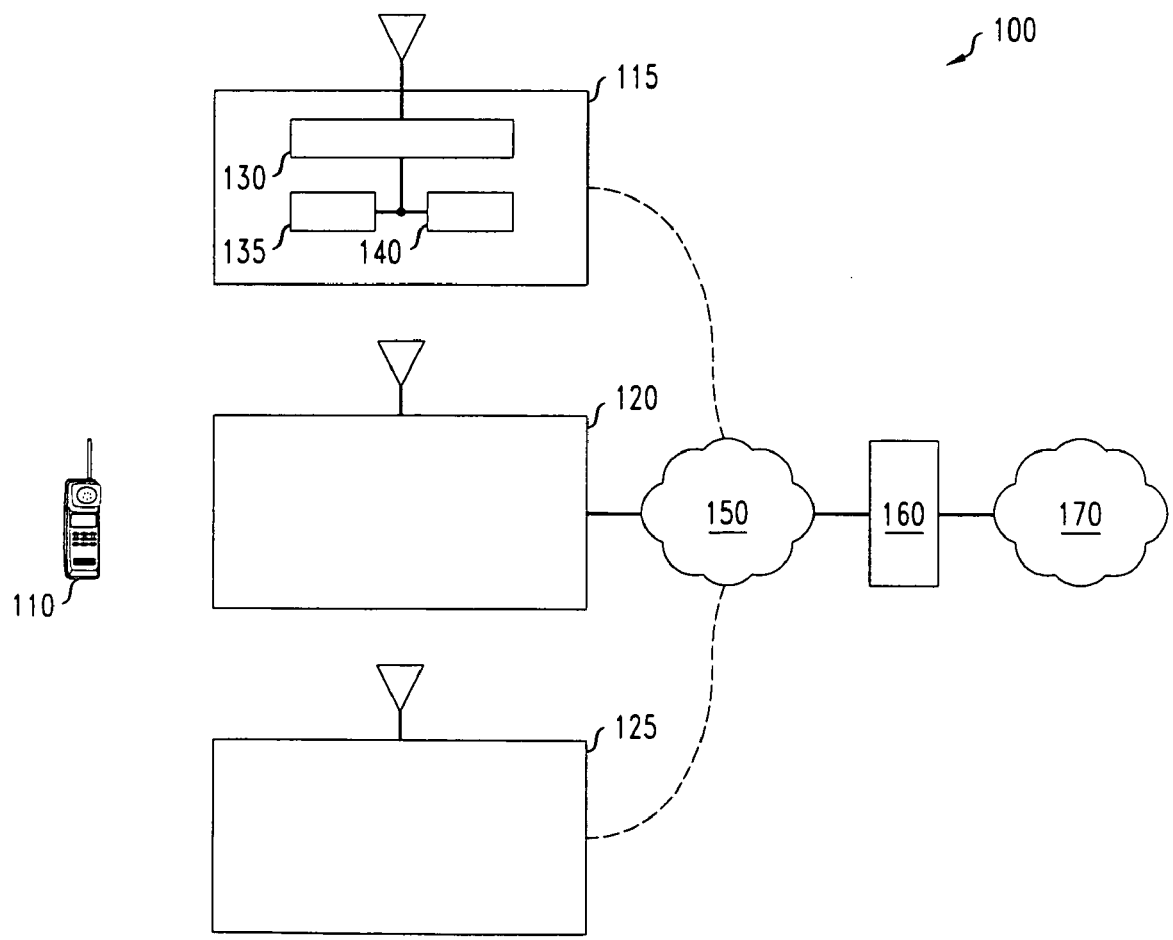
FIG. 3 depicts yet another embodiment of the present invention.

Referring to FIG. 3, another embodiment of the present invention is illustrated. Here, a wireless communication network 100 supportive of high-speed wireless access to the Internet using Internet protocol networks is shown. As shown, wireless communication network 100 employs a CDMA 2000 architecture.

Wireless communication network 100 comprises a wireless unit 110. Wireless unit 110, such as a cellular phone or other device, may connect to the network through one of a number of base stations 115, 120 and 125. Each base station connects to an IP backhaul network 150 and, in turn, a central office 160 having a wireless router(s) and a radio network controller(s) ("RNC") therein to manage the traffic hand-off between base stations and through an IP core network 170. The RNC may assist in the hand-off device management and terminal-level security, such as by using a remote authentication dial-end user service server. The RNC may support a plurality of radio nodes and connect to a service provider's core data network using a packet data serving node as the wireless router.

Each base station, such as exemplary unit 115, may include a loading detector 135 for determining the loading associated with the reverse link transmission of wireless unit 110. Moreover, base station 115 may also comprise wireless transmission controller 140 for controlling the reverse link loading by either a fast control with a traffic channel or a slower control of the number of active connections as based on an average of a received signal strength indication rise and filtered loading estimation, including a short and long term average respectively. Each base station may also perform radio frequency processing, base band modulation/demodulation and packet scheduling though an RF section 130.

Wireless communication network 100 may use adaptive modulation systems. In so doing, each base station 115, 120 and 125 may be allowed to optimize transmission rates using instantaneous channel feedback, advanced turbo coding, multi-level modulation and macro diversity with sector selection. Wireless communication network 100 may also allow multi-user diversity for packet scheduling and adaptive channel feedback for optimized communications.

Wireless communication network 100 may, however, not be closely coupled to legacy circuit-switched wireless voice networks. Thus, the IP technologies can be used to build these networks. This may allow for lower backhaul costs because the IP transport can be used between base stations and the RNC. Some operators may choose different backhaul services, including frame relay and other router networks, and, in some cases a wireless backhaul or metropolitan Ethernet. Standard routers, servers and other IP equipment that are usually purchased commercially off-the-shelf ("COTS") can be used with open standards.

The above configuration may allow users to have an enhanced quality of service ("QoS"). Consequently, the present embodiment may support some packet schedulers using QoS to operate more freely within wireless communications network 100. Wireless communications network 100 may also support use of a multimode terminal to allow some subscribers to receive incoming voice calls even while downloading data.

Figure 6:
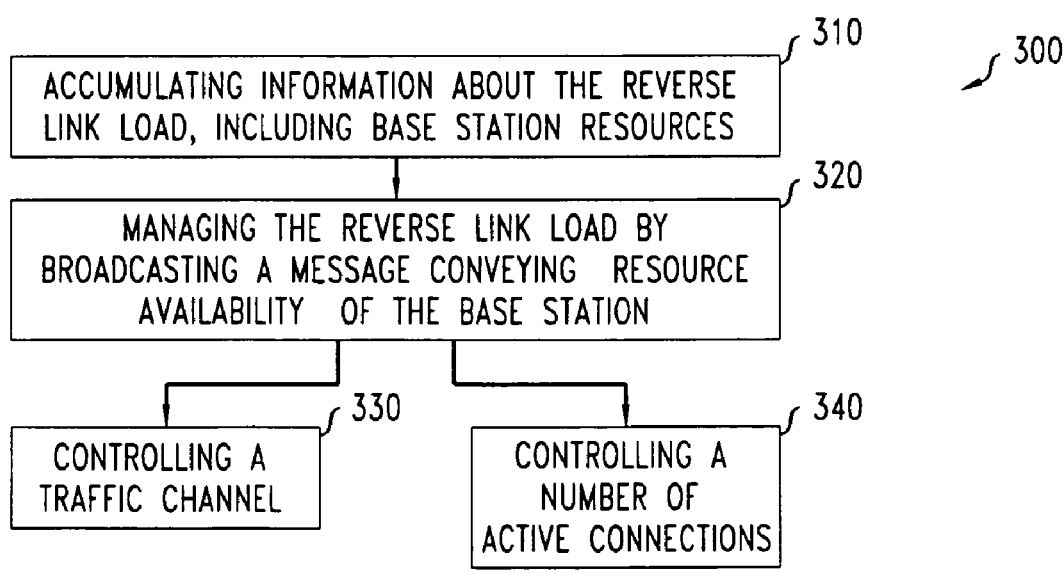
FIG. 6 depicts still another embodiment of the present invention.

Referring to FIG. 6, a flow chart depicting another embodiment of the present invention is illustrated. More particularly, a method (300) is depicted for controlling the loading over the reverse link. Here, information about the reverse link is initially accumulated (step 310). This information may include various base station resource data, as detailed hereinabove. This accumulating step may include determining a loading on the reverse link. The step of determining a loading on the reverse link may include sampling the received signal strength indication. A noise floor and the rise in the signal strength indication may then be calculated in response to the sampling of the received signal strength indication.

Thereafter, the reverse link load is managed by controlling a traffic channel and/or a number of active connections (step 320). Here, a message may be broadcast conveying the resource availability of the base station. This broadcast message is generated in response to the determined reverse link loading resulting from accumulating the resource information (step 10). Here, the step of controlling a traffic channel may include a relatively faster control of the traffic channel. Similarly, the number of active connections may be controlled by means of a relatively slower control.

It should be noted that the reverse link loading may be managed in response to an average of a rise in a received signal strength indication and filtered loading estimation. Here, a relatively shorter term should correspond with a relatively fast control of the traffic channel. Likewise, a relatively longer term average should correspond with a relatively slow control of number of active connections.

It should also noted that the two or more metrics relied on herein may be sampled at different frequencies. In this scenario, one of the metrics is sampled slower and may be updated based on other metrics. Alternatively, the metric may be held constant until a new value may be received.

EXEMPLARY EMBODIMENTS

An RL overload control algorithm may be required to protect the wireless network against performance degradation as results from increased interference. Such an algorithm may have a number of objectives, including dynamically allocate RL sector resource to all users on an as-needed basis and to trade-off between supporting more active users to increase forward link throughput, in comparison with RL throughput. Additionally, this algorithm may attempt to maintain the integrity of the Media Access Control ("MAC") channel (e.g., both Dynamic Rate Change ("DRC") channel and Acknowledgment ("ACK") channel) and the traffic channel for existing users. This algorithm may seek to also avoid instability on the reverse link by making sure that the sector/system loading is within reasonable limits—e.g., approximately 70% of the pole point. The RL overload control algorithm may attempt to maintain reverse link coverage.

A Rate Limit message may specify the maximum transmit rate allowed by the access terminal. A more efficient method may change the setting of the RAB. The RAB may be sent in every slot—e.g., once every 1.66 milliseconds—regardless of whether the slot has data or not. An Access Terminal ("AT") however may monitor the RAB from the forward links in the active set much like the pilot and power control bit. If any one of the forward links has set the RAB—e.g., RAB is equal to "1"—the AT should decrease the transmit rate by half if the transition probability test is passed, provided the current transmit rate is not already at 9.6 kbps. If all of the forward links in the active set have not set the RAB—e.g., RAB is equal to "0"—then the AT may double the rate, if the transition probability test is passed and provided the current rate is not already at 153.6 kpbs.

The Reverse Link Overload Control system and method detailed herein may have two major processing components: (1) Reverse Link Overload Detection; and (2) Reverse Link Overload Control. The Reverse Link Overload Detection algorithm may generally consider two decision inputs, namely sector loading and the rise in the received signal strength indication ("RSSI"), for example.

Sector loading may be computed by using the Ecp/Nt (Energy in the Pilot Over Total Noise), the DRC Channel Gain, DRC Length, ACK Channel Gain and the received data rate with the Data Offset Power—e.g., DataOffset—for all users that may be power controlled by this sector, together with the ratio of the interference from neighboring cells/sectors to the interference of this sector. Consequently, the number of total Walsh Codes in use, the DRC Channel Length, DRC Channel Gain, ACK Channel Gain and pilot, the received reverse link activity based on the Reverse Rate Indicator ("RRI") channel and the power (e.g., DataOffset per rate used), error rates on the physical channel(s) and other-sector/cell interference may be considered.

To increase the accuracy of the detection, and to compensate for the inaccuracy of other-cell interference, the RSSI Rise may be used, for example. The RSSI rise may be considered an indicator of the sector coverage and may offer additional information of the sector loading and interference. The RSSI may be measured at the J4 antenna "one" connector and may be considered as the total received power at the sector. RSSI rise refers to the rise of the RSSI above the noise floor. The rise of the RSSI may also represent the sector loading if the noise floor is accurately measured and no jammers are considered and expressed by the following formula:

$$L = 1 - 1/10^{Median[Z]/10}$$

where L is the average loading and Median [Z] is the median of the RSSI rise dB.

While a relatively high loading may cause a high RSSI, the contrary may not be true. This is in part because the RSSI value has three components, including noise floor, interference, corresponding to loading, and jammer interference. Therefore, a relatively high RSSI value can be caused by increased noise floor, high loading, and/or jammers. By using a combination of total Eb/Nt loading and RSSI rise, loading can be more accurately estimated.

It should be noted that disclosure herein might create a silent period of a relatively short time duration. This may be realized by ceasing all transmissions on the RL for the wireless communication system. The system and method disclosed herein may make use of this pause in transmission to modify the noise floor measurement process.

The approach to estimating the reverse link loading based on the number of active connections, including softer/soft handoff legs, and the received activities on the reverse link traffic channel can be expressed mathematically as follows:

$$X = \sum_{i=1}^{M} F\left[MAC_{activity}, TRAFFIC_{activity}, \left(\frac{E_{cp}}{N_t}\right)\right]$$

where M is the total users in the sector, $MAC_{activity}$ includes DRC Length, DRC Gain, ACK Gain, $TRAFFIC_{activity}$ is received traffic rate from the AT and DataOffset value, and $E_{cp}/N_t$ is the received pilot power from the AT. This may also require the DRC Length, DRC Gain, ACK Gain, DataOffset per rate value be available for loading calculation.

It should be noted that the reverse link overload control action may be broken into two components—namely, a fast control of the traffic channel based on the short term average, and a slower control of the number of active connections based on a long-term average. Both fast control and slow control may be based on the RSSI Rise and Filtered Loading estimation. The RSSI Rise and Filtered Loading are segmented into decision regions as depicted in FIGS. 4 and 5, and detailed hereinabove. The RSSI Rise threshold may be higher if the loading is smaller. This minimizes adverse control reactions based on a purely RSSI Rise.

The loading region for fast control purposes may be determined every 200 milliseconds, for example, for each section/carrier. This may be realized by computing the RSSI rise using the following mathematical expressions:

$$RSSI\_rise(R_{fast}) = s\_avg\_rssi(dBm) - avg\_noise\_floor(dBm)$$

If $R_{fast} < 0$, set $R_{fast}$ to 0 instead where the latest s_avg_rssi and avg_noise_floor are employed. The system finds a Region (Normal Region or Fast Control Region) using filtered loading avg_X(L) and $RSSI\_rise(R_{fast})$ (every 200 ms) as shown in the table of FIG. 7, which depicts Filtered Loading, $R_{fast}$, as a function of f_thresh_1, f_thresh_2, f_thresh 3 may be tunable parameters.

The controls actions in this regard may be expressed by the following set of algorithmic steps. If $RSSI\_rise(R_{fast})$ falls into Fast Control Region, the RAB is set to 1, else if RSSI_rise ($R_{fast}$) falls into Normal Region, set the RAB to 0. Other different and/or more complicated control strategies may be also used. For example, slow control may be based on a much longer average window.

The loading region for long term control purposes may be determined every 5 seconds for each sector/carrier. Consequently, the RSSI rise may be computed by using the following mathematical expression:

$$RSSI\_rise(R_{slow}) = L\_avg\_rssi(dBm) - avg\_noise\_floor(dBm)$$

where the latest L_avg_rssi and avg_noise_floor are employed. The system may find a Region (Normal Region or Slow Control Region) using filtered loading avg_X(L) and RSSI_rise(Rs) as shown in the table of FIG. 8, which depicts Filtered Loading, $R_{slow}$, as a function of f_thresh_1, f_thresh_2, f_thresh 3 may be tunable parameters.

The controls actions in this regard may be expressed by the following set of algorithmic steps. If a sector is in the Slow Control Region, the longest idle user (>T_min seconds) may be pushed to inactive or dormant status and new user IN may be added. In the first alternative, if all the users are active (or <T_min seconds dormant), the user with the maximum number of bytes transferred, presuming that the maximum number of bytes transferred is >Min_bytes_transferred, may be pushed to inactive status and new user IN may be added. In the second alternative, if there are no active idle users (>T_min seconds) or users with a maximum number of bytes transferred (>Min_bytes transferred), the access resistance timer may be changed to a subsequently determined value. The access resistance timer determines if the user may be allowed to make another access attempt after the previous access attempt failed. If the sector is not in Slow Control Region, then the user IN should be added. More complicated strategies based on backhaul link impact may also be considered.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, the method, system and portions thereof and of the described method and system may be implemented in different locations, such as the wireless unit, the base station, a base station controller and/or mobile switching center. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention It is therefore contemplated that the appended claims will cover any such modifications or embodiments as fall within the true scope of the invention.

The invention claimed is:

1. A method of wireless communication comprising:
evaluating a reverse link loading by examining at least two resources within a first time period wherein the evaluating includes selecting at least a first threshold by which at least a first of the at least two resources is evaluated, based on the examination of at least a second of the at least two resources, wherein evaluating further comprises at least one of: examining the at least two resources in use and examining the at least two resources leftover, wherein the at least two resources examined comprise at least one of a sector loading; total interference, received signal strength indication rise, per-leg and per-call frame error rate, physical channel erasure statistics and distributions, filtered loading estimate, transmit power and power control outer-loop set point compared to received Ecp/Nt, wherein evaluating a reverse link loading comprises computing the sector loading by measuring energy in a pilot signal over total noise, DRC values, channel gain and used Walsh code space and the received signal strength indication rise corresponds with a total received power at a sector, with a noise floor and with at least the first threshold, which varies to minimize adverse control reactions; and
broadcasting an availability of resources message in response to the evaluated reverse link loading.

2. The method of claim 1, comprising:
sampling a received signal strength indication; and
calculating a noise floor and the received signal strength indication rise in response to the sampling received signal strength indication.

3. The method of claim 1, further comprising changing a longest idle user to at least one of inactive status and dormant status if a sector state is above a slow control threshold.

4. The method of claim 3, further comprising at least one of:
inactivating a user with a maximum number of bytes transferred if all users are active; and
changing an access resistance timer if all users are not at least one of active idle and having a maximum number of bytes transferred.

5. The method of claim 4, wherein the access resistance timer determines if subsequent access attempts by a user after a previous attempt failed.

6. The method of claim 1, wherein the availability of resources message corresponds with at least one of an overload condition, increasing a number of active connections, maintaining the number of active connections, decreasing the number of active connections, increasing an available transmit rate, maintaining the available transmit rate and decreasing the available transmit rate.

7. The method of claim 6, wherein the availability of resources message comprises a reverse activity bit.

8. The method of claim 6, comprising controlling the reverse link by at least one of:
managing a traffic channel in response to an average of the received signal strength indication rise and the filtered loading estimate; and
managing the number of active connections in response to the average of the received signal strength indication rise and the filtered loading estimate.

9. The method of claim 6, comprising:
determining an available transmit rate in response to examining the at least two resources associated with the reverse link within a second time period, the second time period being an order of magnitude greater than the first time period.

10. A wireless communication system comprising:
a detector for evaluating a reverse link loading by examining at least two resources within a first time period wherein the evaluating includes selecting at least a first threshold by which at least a first of the at least two resources is evaluated, based on the examination of at least a second of the at least two resources, wherein the detector performs at least one of examining the resources in use within the first time period and examining the resources leftover within the first time period, and the at least two resources examined comprise at least one of a sector loading, total interference, received signal strength indication rise, local and global frame error rate and distribution, filtered loading estimate, transmit power, received Ecp/Nt, received Eb/Nt, and power control outer-loop set point and wherein the detector computes the sector loading by measuring energy in a pilot signal over total noise, DRC values, channel gain and used Walsh code space and the received signal strength indication rise corresponds with a total received power at a sector, with a noise floor and with at least the first threshold, which varies to minimize adverse control reactions; and
a controller for controlling the reverse link loading by broadcasting an availability of resources message in response to the evaluated reverse link loading.

11. The wireless communication system of claim 10, comprising:
a sampler for sampling a received signal strength indication; and
a calculator for calculating a noise floor and the received signal strength indication rise in response to the sampling received signal strength indication.

12. The wireless communication system of claim 10, wherein the availability of resources message corresponds with at least one of an overload condition, increasing a number of active connections, decreasing the number of active connections, increasing an available transmit rate, maintaining the available transmit rate and decreasing the available transmit rate.

13. The wireless communication system of claim 12, wherein the availability of resources message comprises a reverse activity bit.

14. The wireless communication system of claim 12, comprising:
a controller for managing the reverse link by at least one of:

controlling a traffic channel transmission rate in response to a relatively short term average of the received signal strength indication rise and the filtered loading estimate; and controlling the number of active connections in response to a relatively long term average of the received signal strength indication rise and the filtered loading estimate.

15. The wireless communication system of claim 12, wherein the detector determines an available transmit rate in response to examining the at least two resources associated with the reverse link within a second time period, the second time period being an order of magnitude greater than the first time period.

16. A method of wireless communication over a reverse link comprising:

determining a loading on the reverse link wherein the determining includes selecting at least a first threshold by which at least a first of the at least two resources is evaluated, based on an examination of at least a second of the at least two resources, wherein the at least two resources examined comprise at least one of a sector loading; total interference, received signal strength indication rise, per-leg and per-call frame error rate, physical channel erasure statistics and distributions, filtered loading estimate, transmit power and power control outer-loop set point compared to received Ecp/Nt and wherein evaluating the reverse link loading comprises computing the sector loading by measuring energy in a pilot signal over total noise, DRC values, channel gain and used Walsh code space and the received signal strength indication rise corresponds with a total received power at a sector, with a noise floor and with at least the first threshold, which varies to minimize adverse control reactions;

managing the reverse link loading in response to the determined reverse link loading by at least one of controlling a traffic channel data rate and controlling a number of active connections; and broadcasting an availability of resources message in response to the determined reverse link loading.

17. The method of claim 16, wherein controlling the traffic channel data rate comprises a relatively faster control of the traffic channel data rate and controlling a number of active connections comprises a relatively slower control.

18. The method of claim 17, wherein the managing the reverse link loading is performed in response to an average of a rise in a received signal strength indication and filtered loading estimation, the average comprising at least one of a relatively shorter term and a relatively longer term average.

19. The method of claim 16, wherein the step of determining a loading on the reverse link comprises:

sampling the received signal strength indication rise; and calculating a noise floor and the rise in the signal strength indication rise in response to the sampling of the received signal strength indication.

* * * * *